May 16, 1967  L. N. PETERSON  3,319,650
CONSTRUCTION FOR Y-SHAPED VALVES, COUPLINGS OR THE LIKE
Filed Aug. 17, 1964

INVENTOR.
Loren Neil Peterson
BY
Hovey, Schmidt, Johnson & Hovey
ATTORNEYS.

United States Patent Office 3,319,650
Patented May 16, 1967

---

3,319,650
CONSTRUCTION FOR Y-SHAPED VALVES, COUPLINGS OR THE LIKE
Loren Neil Peterson, Salina, Kans., assignor to Salina Manufacturing Company, Inc., Salina, Kans., a corporation of Kansas
Filed Aug. 17, 1964, Ser. No. 389,853
8 Claims. (Cl. 137—561)

This invention relates to improvements in Y-shaped valves or couplings and, more specifically, to Y-shaped coupling structure having a swivel joint which enables the structure to be employed in a wide number of applications.

Y-shaped valves and couplings are employed in pneumatic and gravity feed dry material conveyor systems as a means of diverting material from the main line to branch lines. Such systems find widespread use in bakeries, chemical plants, and other diversified industrial applications where dry material must be conveyed by piping from one location to another.

In the design of a pneumatic conveying system, a primary consideration is the air pressure loss or resistance to flow which will be encountered as the material flows through the main line and is diverted to branch lines coupled therewith at various locations. Heretofore, it has been the practice to employ a Y-shaped coupler at a junction, with the result that both the branch line and the continuing main line were out of alignment with the preceding portion of the main line. Since every bend in the main line necessarily causes an air pressure loss, it is evident that, after a number of junctions have been encountered, a considerable pressure loss will occur. Thus, it has been the practice to provide a blower for the system of sufficient size to maintain a minimum required pressure at the termination of the main line. Manifestly, this necessitates the utilization of pneumatic blowers of larger capacity, complexity, and cost than would be needed if the air pressure loss through the system were materially reduced.

It is, therefore, the primary object of this invention to provide a Y-shaped valve or coupler which will reduce pressure losses in pneumatic dry material conveyor systems.

It is another object of the instant invention to provide a Y-shaped valve or coupler which will permit substantially straight-line layout of the main, material conveying line of a pneumatic or gravity feed system.

It is another object of this invention to provide a Y-shaped valve or coupler which may be universally employed in the design of pneumatic or gravity feed dry material conveyor systems, so that a number of couplers of varying configurations will not need to be employed in the construction of the desired conveyor arrangement.

Still another object of this invention is to provide a coupling construction as aforesaid provided with a swivel joint permitting utilization thereof in any one of at least two operational modes.

Yet another object of the instant invention is to provide such a coupling construction in which the swivel joint allows alignment of the main line of the system with one leg of the coupling to prevent a loss of pressure in the subsequent section of the main line or, alternatively, permits splitting of the main line into a pair of branch lines.

Other objects will become apparent as the detailed description proceeds.

Figure 1:
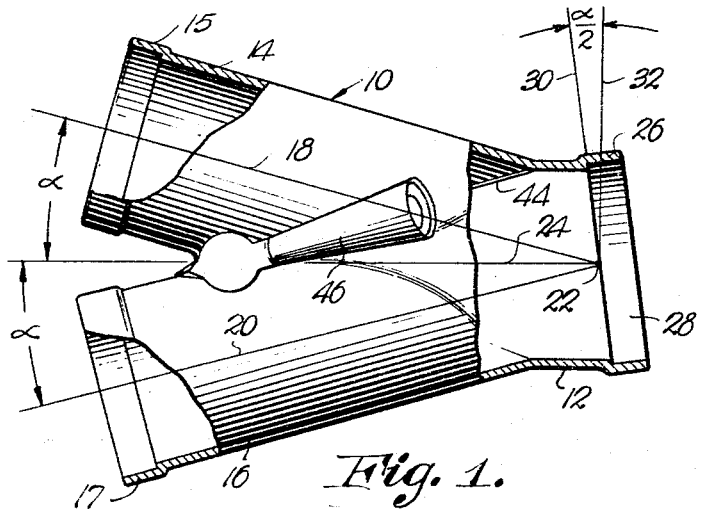
FIGURE 1 is a plan view of a Y-shaped coupling body constructed in accordance with the teachings of the instant invention, certain portions thereof being broken away to reveal structural details.

A Y-shaped coupling body generally designated 10 includes a shank 12 and a pair of diverging legs 14 and 16. Shank 12 normally forms the input to the body, while the legs 14 and 16 constitute the output portions thereof for directing material fed into the shank to a line or lines. The flared ends 15 and 17 of legs 14 and 16 serve to facilitate coupling of the legs with the output lines.

It may be seen that the shank 12 and the legs 14 and 16 are of tubular configuration and are integrally formed. Legs 14 and 16 have longitudinal axes 18 and 20, respectively, which converge at a point 22. Shank 12 is also of tubular configuration and, over a portion of its length, is circularly symmetrical about an axis 24. Axis 24 extends through point 22, the legs 14 and 16 being disposed with respect to shank 12 such that axis 24 bisects the angle formed by the axis 18 and 20. The two equal angles so formed are each designated $\alpha$ in FIG. 1.

The end of 26 of shank 12 remote from the legs is flared and offset with respect to axis 24. The inner, annular surface of end 26 defines a mouth 28 having circular symmetry about an axis which forms an angle with axis 24 equal to $\alpha/2$. Line 30 in FIG. 1 is normal to the axis (not shown) of mouth 28, line 32 being normal to axis 24. Thus, the angle $\alpha/2$ between lines 30 and 32 is equal to the angle formed by the axis of mouth 28 and axis 24 of shank 12.

Figure 3:
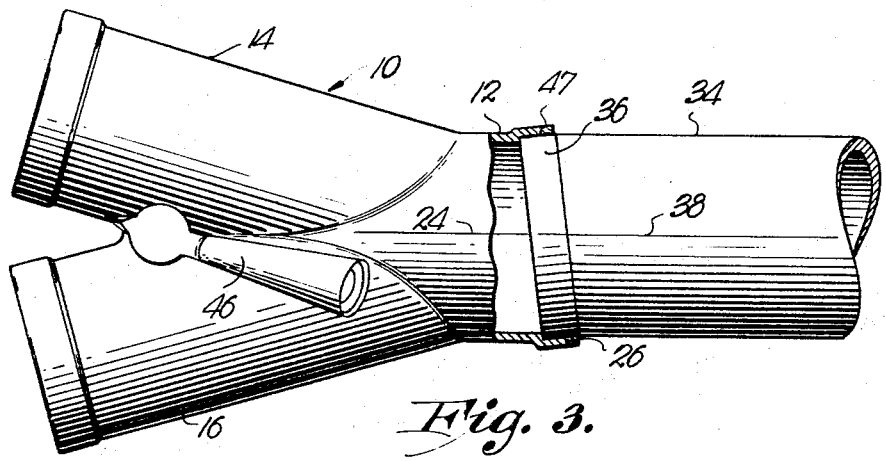
FIG. 3 is a plan view of the invention showing the component parts thereof joined together.
Figure 4:
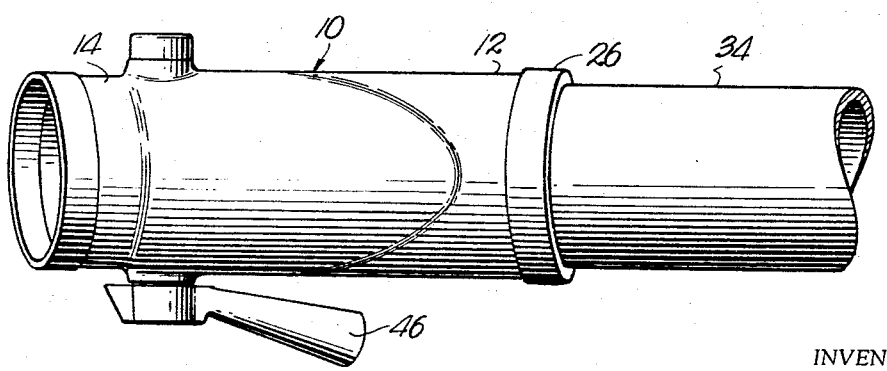
FIG. 4 is a side elevational view.

A conduit or tube 34, which may comprise a section of the main line of a material conveyor system, is provided with an offset end piece 36 which is received by mouth 28. Conduit 34 is of tubular configuration, its longitudinal axis being designated 38. A line 40 normal to axis 38 is shown to illustrate that an angle equal to $\alpha/2$ exists between this line and another line 42 which is perpendicular to the axis (not shown) of the offset end piece 36. Piece 36 is circularly symmetrical about its axis and has an outside diameter slightly less than the internal diameter of mouth 28. Therefore, the mouth and the end piece mate to form a swivel joint, as illustrated in FIG. 3, relative rotation of offset end 26 and the offset piece 36 being about their common, aligned axes.

A valve member 44 is diagrammatically illustrated in FIG. 1 under the control of a selector handle 46. It should be understood that valve 44 may comprise any one of a variety of conventional valve configurations employed with coupling devices of the type here shown and described or, if the instant invention is to be used simply as a junction or coupler for the purpose of forming a main stream of material into a pair of subsidiary streams, valve 44 may be omitted from the construction.

Figure 2:
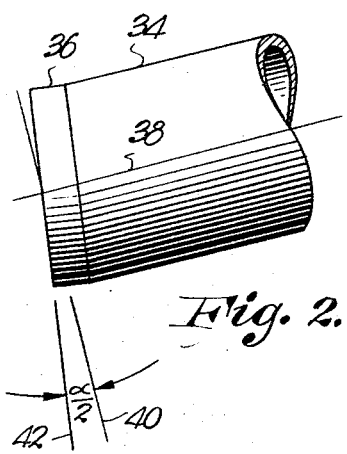
FIG. 2 is a view showing conduit structure employed in the instant invention, the illustrations of FIGS. 1 and 2 being arranged with relation to one another to form an exploded view of the construction of the instant invention.

Viewing FIGS. 1 and 2 collectively, it may be appreciated that joining of shank 12 and conduit 34 forms a unit in which the axis 20 of leg 16 is in substantial alignment with the axis 38 of conduit 34. This is due to the fact that mouth 28 and end piece 36 are each offset by an angle $\alpha/2$, thus the total offset when combined in the position shown in FIGS. 1 and 2 is equal to $\alpha$, or the angle formed by the axis 24 of shank 12 and the axis 20 of leg 16. In this manner, it may be appreciated that material flowing leftwardly, as viewed in FIGS. 1 and 2, along conduit 34 will pass through and out of leg 16 without encountering any substantial bends or discontinuities in its path of travel. In FIG. 3, however, it may be seen that conduit 34 has been rotated to a different position with respect to shank 12 and that, in this disposition, the axes of the shank and the conduit are in substantial alignment. The instant invention now functions as a diverter or splitter which divides the material flowing through conduit 34 into two streams which pass through and out of legs 14 and 16. In the utilization of the device, either of these two positions may be chosen to accommodate system design, and an adhesive epoxy band or layer 47 employed to maintain the two rotatable components in the desired fixed position. The molten plastic which hardens to form the adhesive band 47 may be poured into the swivel joint at the system installation site, or the apparatus may be fabricated with the two rotatable components fixed in the desired positional relationship.

It may be appreciated from the foregoing that assembly of the device in the FIG. 1 position provides minimum pressure drop along the main line of the conveyor system since no sudden bends or diversions are encountered at branch line junctions. Conduit 34 and leg 16 would form a part of the main line, while leg 14 would transmit material to a branch line for passage to a point of application. When used in this manner, valve 44 would be shifted to a position in which both legs 14 and 16 were open and unobstructed. Thus, the only substantial pressure drops encountered would be in the branch lines themselves which, of course, diverge from the main line by an angle equal to $2\alpha$.

As illustrated in FIG. 3, the invention is equally useful when it is desired to split the main stream or a branch stream, since the swivel joint arrangement permits substantial alignment of the axes 24 and 38 of shank 12 and conduit 34. Valve 44 would then be employed to permit the stream to split equally between the two legs, or be disposed to block one of the legs depending on demand requirements and operator selection. Manifestly, when employed in the position shown in FIGS. 1 and 2, valve 44 would normally either block leg 14 or permit free passage in both legs, since blocking of the main stream passing through leg 16 would usually not be desired. Thus, regardless of the application, the invention allows the system designer to select the most efficient configuration for any given condition with one basic valve or coupler construction.

In most applications it is preferred that $\alpha = 15°$; therefore, $\alpha/2$ will equal $7\frac{1}{2}°$.

Having thus described the invention what is claimed as new and desired to be secured by Letters Patent is:

1. In a Y-shaped coupling body provided with a shank and a pair of diverging legs extending from one end of the shank, the axis of the shank extending between the axes of the legs and forming an angle $\alpha$ with the axis of one of said legs, the combination with said shank of:
 a conduit provided with an offset end piece disposed with its axis forming an angle with the axis of the conduit substantially equal to $\alpha/2$;
 structure at the other end of said shank presenting an offset mouth and disposed with the axis of the mouth forming an angle with the axis of the shank substantially equal to $\alpha/2$; and
 means for joining the end piece and the structure with the axes of the end piece and the mouth in alignment, and with the conduit disposed in any one of two positions, the first position being with the conduit in substantial axial alignment with said one leg, the second position being with the conduit in substantial axial alignment with said shank.

2. The invention of claim 1, wherein said structure is disposed with the axis of the mouth bisecting the angle $\alpha$.

3. The invention of claim 1, wherein said mouth is transversely circular and receives said end piece, whereby to permit relative rotation of the structure and the end piece about their common axes to dispose the conduit in the desired position prior to joining the structure and end piece together.

4. In a Y-shaped coupling body provided with a shank and a pair of diverging legs extending from one end of the shank, the axis of the shank extending between the axes of the legs and forming an angle $\alpha$ with the axis of one of said legs, the combination with said shank of:
 a conduit provided with an offset end piece disposed with its axis forming an angle with the axis of the conduit substantially equal to $\alpha/2$;
 structure at the other end of said shank presenting an offset mouth and disposed with the axis of the mouth forming an angle with the axis of the shank substantially equal to $\alpha/2$, said structure receiving said end piece with the axes of the latter and the mouth in alignment and with the conduit disposed in one of two positions, the first position being with the conduit in substantial axial alignment with said one leg, the second position being with the conduit in substantial axial alignment with said shank; and
 means for securing the end piece to the structure with the conduit disposed in any one of said positions.

5. The invention of claim 4, wherein said structure is disposed with the axis of the mouth bisecting the angle $\alpha$.

6. In a Y-shaped coupling body provided with a shank and a pair of diverging legs extending from one end of the shank, the axis of the shank extending between the axes of the legs and forming an angle $\alpha$ with the axis of one of said legs, the combination with said shank of:
 a conduit; and
 a swivel joint at the other end of said shank, including structure on said other end presenting an offset mouth having an axis forming a predetermined angle less than $\alpha$ with the axis of said shank, and an offset piece on one end of said conduit having an axis forming an angle with the axis of said conduit equal to the difference between $\alpha$ and said predetermined angle, the mouth and the piece being coaxially aligned and disposed for relative rotation about their common axes to shift the conduit between a first position, where the axis thereof is in substantial alignment with the axis of said one leg, and a second position where the axis of the conduit is out of alignment with the axis of said one leg.

7. The invention of claim 6, wherein the structure is disposed with the axis of said mouth bisecting the angle $\alpha$, said piece being disposed with the angle formed by its axis and the axis of said conduit substantially equal to $\alpha/2$.

8. The invention of claim 7, wherein said shank is disposed with its axis bisecting the angle formed by the axes of the diverging legs, whereby material flowing through the conduit to the legs is equally distributed between the latter when the conduit is in substantial axial alignment with the shank.

References Cited by the Examiner

UNITED STATES PATENTS

| | | | |
|---|---|---|---|
| 692,375 | 2/1902 | Snider | 285—178 |
| 807,662 | 4/1905 | Crowther | 285—331 |
| 2,082,374 | 6/1937 | Angus | 285—150 |

M. CARY NELSON, *Primary Examiner.*

W. C. CLINE, *Assistant Examiner.*